United States Patent
Pandey et al.

(10) Patent No.: US 9,426,095 B2
(45) Date of Patent: Aug. 23, 2016

(54) APPARATUS AND METHOD OF SWITCHING PACKETS BETWEEN VIRTUAL PORTS

(75) Inventors: Vijoy Pandey, San Jose, CA (US); Rakesh Saha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 12/550,173

(22) Filed: Aug. 28, 2009

(65) Prior Publication Data

US 2010/0054260 A1 Mar. 4, 2010

Related U.S. Application Data

(60) Provisional application No. 61/092,540, filed on Aug. 28, 2008, provisional application No. 61/102,423, filed on Oct. 3, 2008.

(51) Int. Cl.
| | |
|---|---|
| *H04L 12/28* | (2006.01) |
| *H04L 12/931* | (2013.01) |
| *H04J 1/16* | (2006.01) |
| *H04L 12/937* | (2013.01) |
| *H04L 12/935* | (2013.01) |

(52) U.S. Cl.
CPC ............ *H04L 49/351* (2013.01); *H04L 49/00* (2013.01); *H04L 49/70* (2013.01); *H04L 49/254* (2013.01); *H04L 49/3045* (2013.01); *H04L 49/503* (2013.01)

(58) Field of Classification Search
USPC .................................. 370/252, 389, 392, 399
See application file for complete search history.

(56) References Cited

U.S. PATENT DOCUMENTS

| | | | | |
|---|---|---|---|---|
| 5,434,850 | A | * | 7/1995 | Fielding ............. H04B 7/18582 370/321 |
| 5,633,868 | A | * | 5/1997 | Baldwin ............ H04Q 11/0478 370/331 |
| 7,519,769 | B1 | | 4/2009 | Kulkarni et al. |
| 7,757,059 | B1 | * | 7/2010 | Ofer et al. ..................... 711/165 |
| 2006/0045089 | A1 | | 3/2006 | Bacher et al. |
| 2006/0194294 | A1 | | 8/2006 | Eyer et al. |
| 2007/0043860 | A1 | | 2/2007 | Pabari et al. |
| 2007/0050763 | A1 | | 3/2007 | Kagan et al. |
| 2007/0110078 | A1 | | 5/2007 | DeSilva et al. |
| 2007/0239944 | A1 | * | 10/2007 | Rupanagunta et al. ...... 711/147 |
| 2007/0280243 | A1 | | 12/2007 | Wray |
| 2008/0043742 | A1 | * | 2/2008 | Pong et al. ................... 370/394 |
| 2008/0212598 | A1 | * | 9/2008 | Kolli et al. ................... 370/409 |
| 2009/0083445 | A1 | * | 3/2009 | Ganga ........................... 709/250 |
| 2010/0005234 | A1 | * | 1/2010 | Ganga et al. ................. 711/105 |
| 2010/0014526 | A1 | * | 1/2010 | Chavan et al. ........... 370/395.53 |

FOREIGN PATENT DOCUMENTS

| | | |
|---|---|---|
| WO | WO2008103936 A1 | 8/2008 |
| WO | WO2009146165 A1 | 12/2009 |

\* cited by examiner

*Primary Examiner* — John Pezzlo
(74) *Attorney, Agent, or Firm* — Schmeiser, Olsen & Watts LLP

(57) ABSTRACT

A method and network switch for switching data units assigns a unique virtual port to each end-node operating on a physical machine connected to a physical port of network switch. A data unit, sent by a given end-node operating on the physical machine, is received at the physical port. The received data unit is switched to the virtual port assigned to the given end-node. Based on the virtual port assigned to the given end-node, the data unit is switched to a second physical port of the network switch for subsequent forwarding of the data unit towards its destination.

19 Claims, 7 Drawing Sheets

APPARATUS AND METHOD OF SWITCHING PACKETS BETWEEN VIRTUAL PORTS

RELATED APPLICATIONS

This application claims priority to and the benefit of U.S. Provisional Application No. 61/092,540, filed on Aug. 28, 2008, and U.S. Provisional Application No. 61/102,423, filed on Oct. 3, 2008, the entireties of which applications are incorporated by reference herein.

FIELD OF THE INVENTION

The invention relates generally to network switches. More particularly, the invention relates to network switches that use virtual ports to switch data units (e.g., packets).

BACKGROUND

Server virtualization in data centers is becoming widespread. In general, server virtualization describes a software abstraction that separates a physical resource and its use from the underlying physical machine. Most physical resources can be abstracted and provisioned as virtualized entities. Some examples of virtualized entities include the central processing unit (CPU), network input/output (I/O), and storage I/O.

Virtual machines (VM), which are a virtualization of a physical machine and its hardware components, play a central role in virtualization. A virtual machine typically includes a virtual processor, virtual system memory, virtual storage, and various virtual devices. A single physical machine can host a plurality of virtual machines. Guest operating systems execute on the virtual machines, and function as though executing on the actual hardware of the physical machine.

A layer of software provides an interface between the virtual machines resident on a physical machine and the underlying physical hardware. Commonly referred to as a hypervisor or virtual machine monitor (VMM), this interface multiplexes access to the hardware among the virtual machines, guaranteeing to the various virtual machines use of the physical resources of the machine, such as the CPU, memory, storage, and I/O bandwidth.

Typical server virtualization implementations have the virtual machines share the network adapter or network interface card (NIC) of the physical machine for performing external network I/O operations. The hypervisor typically provides a virtual switched network (called a vswitch) that provides interconnectivity among the virtual machines on a single physical machine. The vswitch interfaces between the NIC of the physical machine and the virtual NICs (vNICs) of the virtual machines, each virtual machine having one associated vNIC. In general, each vNIC operates like a physical NIC, being assigned a media access control (MAC) address that is typically different from that of the physical NIC. The vswitch performs the routing of packets to and from the various virtual machines and the physical NIC.

Advances in network I/O hardware technology have produced multi-queue NICs that support network virtualization by reducing the burden on the vswitch and improving network I/O performance. A multi-queued NIC can be provisioned into multiple virtual NICs and can be configured as multiple NICs within an operating system. Generally, multi-queue NICs assign transmit and receive queues to each virtual machine. The NIC places outgoing packets from a given virtual machine into the transmit queue of that virtual machine and incoming packets addressed to the given virtual machine into its receive queue. The direct assignment of such queues to each virtual machine thus simplifies the handling of outgoing and incoming traffic.

Another advance in network I/O hardware technology is a physical interface known as a converged network adapter (CNA). In general, a CNA combines the data networking of a NIC with storage networking; a single physical interface can send and receive network data packets and storage data packets. Each CNA can have multiple virtual interfaces or multiple instances of physical interfaces implemented in a single physical device.

Consequent to the various possible implementations of server virtualization, a physical port of the network switch no longer suffices to uniquely identify the servers or services of a physical host machine because now multiple virtual machines, multiple queues of a multi-queue NIC, multiple interfaces may be connected to that single physical port.

SUMMARY

In one aspect, the invention features a method for switching data units. A unique virtual port is assigned to each end-node operating on a physical machine connected to a physical port of a switching device. A data unit, sent by a given end-node operating on the physical machine, is received at the physical port of the switching device. The received data unit is switched to the virtual port assigned to the given end-node. Based on the virtual port assigned to the given end-node, the data unit is switched to a second physical port of the switching device for subsequent forwarding of the data unit towards its destination.

In another aspect, the invention features a network switch comprising a physical downlink port connected by a physical link to a physical machine having an end-node operating thereon, and a physical uplink port coupled to a network. A management module uniquely assigns a virtual port to the end-node. A switching fabric device receives a data unit that arrives on the physical uplink port from the end-node, switches the data unit to the virtual port assigned to the end-node, and switches the data unit, based on the virtual port, to the physical uplink port for subsequent forwarding of the data unit towards its destination.

In still another aspect, the invention features a chipset including one or more semiconductor integrated circuit (IC) chips. The chipset comprises a circuit configured to assign a unique virtual port to each end-node identified to be operating on a physical machine, a circuit configured to examine a data unit arriving at a physical port from by a given end-node operating on the physical machine, a circuit configured to switch the data unit to the unique virtual port assigned to the given end-node, and a circuit configured to switch the data unit, based on the virtual port assigned to the given end-node, to another physical port for subsequent forwarding of the data unit towards its destination.

In yet another aspect, the invention features a data center comprising a physical machine operating a plurality of end-nodes, a network switch having a physical port connected to the physical machine, and a management module that acquires information about each end-node operating on the physical machine, uses the information to assign a unique virtual port to each end node, and associates each virtual port individually with a network policy. A switching fabric processes data units received through the physical port from each end-node in accordance with the network policy associated with the unique virtual port assigned to that end-node.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers described herein employ network switches that process and switch units of data (e.g., packets, frames, datagrams, cells) based on virtual ports. Logically, a virtual port, or v-port, is a subdivided part of a physical port or of a physical link. Any number of v-ports can be defined for a single physical port or physical link. Network switches use v-ports to process data from virtual machines (for example) and to process different types of data, such as network data and storage data. Such network switches are also referred to herein as "v-port switches".

Virtual ports are uniquely assigned to end-nodes. As described herein, end-nodes are computing or traffic-handling entities operating on physical machines connected to a physical port of a v-port switch. Such entities can be physical entities, such as a network interface card (NIC), or virtual entities, such as a virtual NIC of a virtual machine. As described herein, v-port switches are generally network elements that can learn of the existence and identities of one or more end-nodes of a physical machine, and can detect, monitor, and control traffic (i.e., flows of data units) to and from those end-nodes.

V-port switches use v-ports in similar fashion to that of physical ports, assigning capabilities, network resources, and traffic-handling policies to v-ports and switching traffic between v-ports just as is conventionally practiced with physical ports. In essence, full physical port functionality extends to v-ports, that is, each v-port is treated as having at least the same capabilities as a physical port.

The generation of a virtual port for a v-port switch can occur statically, through administrator configuration, or dynamically (i.e., real-time), through end-node discovery and automatic v-port assignment, as described further below.

Figure 1:
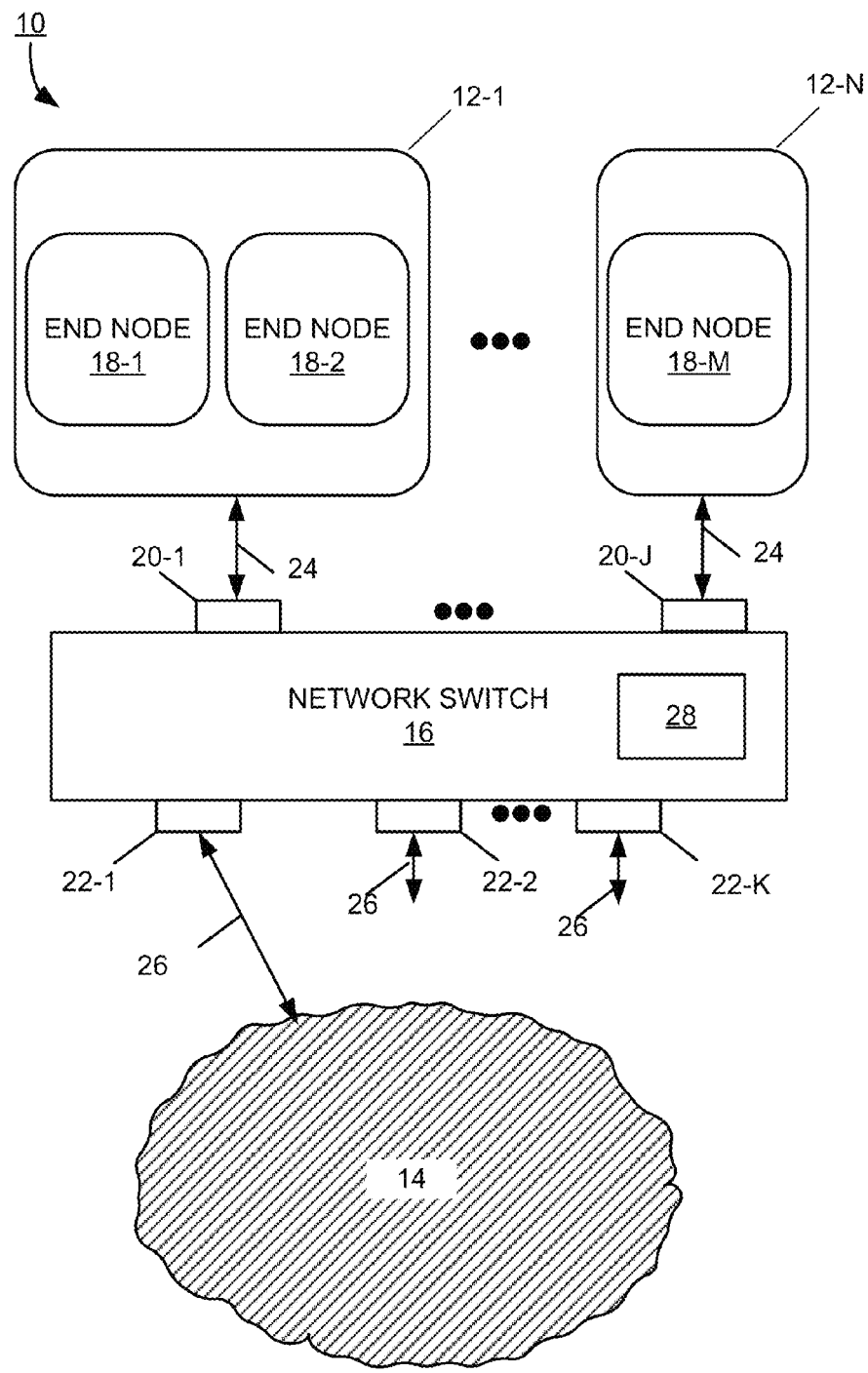
FIG. 1 is a diagram of an embodiment of a data center with one or more physical host machines, each having one or more end-nodes, in communication with a network switch.

FIG. 1 shows an embodiment of an oversimplified data center 10 including a plurality of physical machines 12-1, 12-n (generally, 12) in communication with a network 14 through a network switch 16. The data center 10 can have fewer or more than the two physical machines shown. In addition, although not shown, the data center 10 can have aggregator and gateway switches interposed between the network switch 16 and network 14.

As used herein, a data center is a location that serves as a computational, storage, and networking center of an organization. The equipment of a data center can reside together locally at a single site or distributed over two or more separate sites. The network 14 with which the physical machines 12 are in communication can be, for example, an intranet, an extranet, the Internet, a local area network (LAN), wide area network (WAN), or a metropolitan area network (MAN).

Each physical machine 12 is an embodiment of a physical computing device, such as a server or server blade, and includes hardware (not shown) such as one or more processors, memory, input/output (I/O) ports, network input/output adapter (e.g., network interface card (NIC) or converged network adapter (CNA)) and, in some embodiments, one or more host bus adaptors (HBA). The physical machines 12 can reside alone or be stacked together within a chassis, for example, as in a rack server or in a blade server, and the network switch 16 can reside alone or be stacked within the same equipment chassis as one or more of the physical machines 12.

Hosted by each physical machine 12 are one or more end-nodes (generally, 18). In general, an end-node is an entity operating on a physical machine. These entities can be physical or virtual. Examples of such entities include, but are not limited to, application programs, operating systems, virtual machines, hypervisors, virtual NICs, virtual and physical NIC queues, virtual and physical network I/O interfaces, and virtual and physical storage I/O interfaces. Types of end-nodes include, but are not limited to, network end-nodes and storage end-nodes. Network end-nodes process network data packets, and storage end-nodes process storage data packets. As used herein, physical and virtual end-nodes that perform data networking are called physical and virtual network end-nodes, respectively, whereas physical and virtual end-nodes that perform storage networking are called physical and virtual storage end-nodes, respectively.

In the example shown, the physical machine 12-1 hosts two end-nodes 18-1, 18-2, illustrating that a physical machine can have more than one end-node concurrently operating on that physical machine. Other embodiments of physical machines can have more than two end-nodes. Also shown, physical machine 12-N hosts one end-node 18-M, illustrating that a physical machine can have as few as one end-node.

The embodiment of the network switch 16 shown in FIG. 1 includes a plurality of physical downlink ports 20-1, 20-J (generally, 20) and a plurality of physical uplinks port 22-1, 22-2, 22-K (generally, 22). Embodiments of network switches can have fewer or more physical downlink ports and fewer or more physical uplink ports than the network switch 16. Generally, the network switch 16 is a network element that performs switching of data units between downlink 20 and uplink ports 22. Each physical machine 12 is directly connected to one of the downlink ports 20 by a physical link 24; the physical machine 20-1 is connected to the downlink port 20-1, and the physical machine 20-N is connected to the downlink port 20-N. Uplink ports 22 serve to connect the network switch 16, over physical uplinks 26, to the network 14 (or to aggregator and/or gateway switches).

The network switch 16 includes a management module 28, by which the network switch 16 is configured to perform switching of data units based on virtual ports (also called v-ports). An Ethernet switch is an example of one implementation of the network switch 16. In one embodiment, the network switch 16 is implemented using a 24-port 10 Gb Ethernet switch module manufactured by Blade Network Technologies, Inc. of Santa Clara, Calif. Hereafter, the network switch 16 is also referred to as v-port switch 16.

Figure 2:
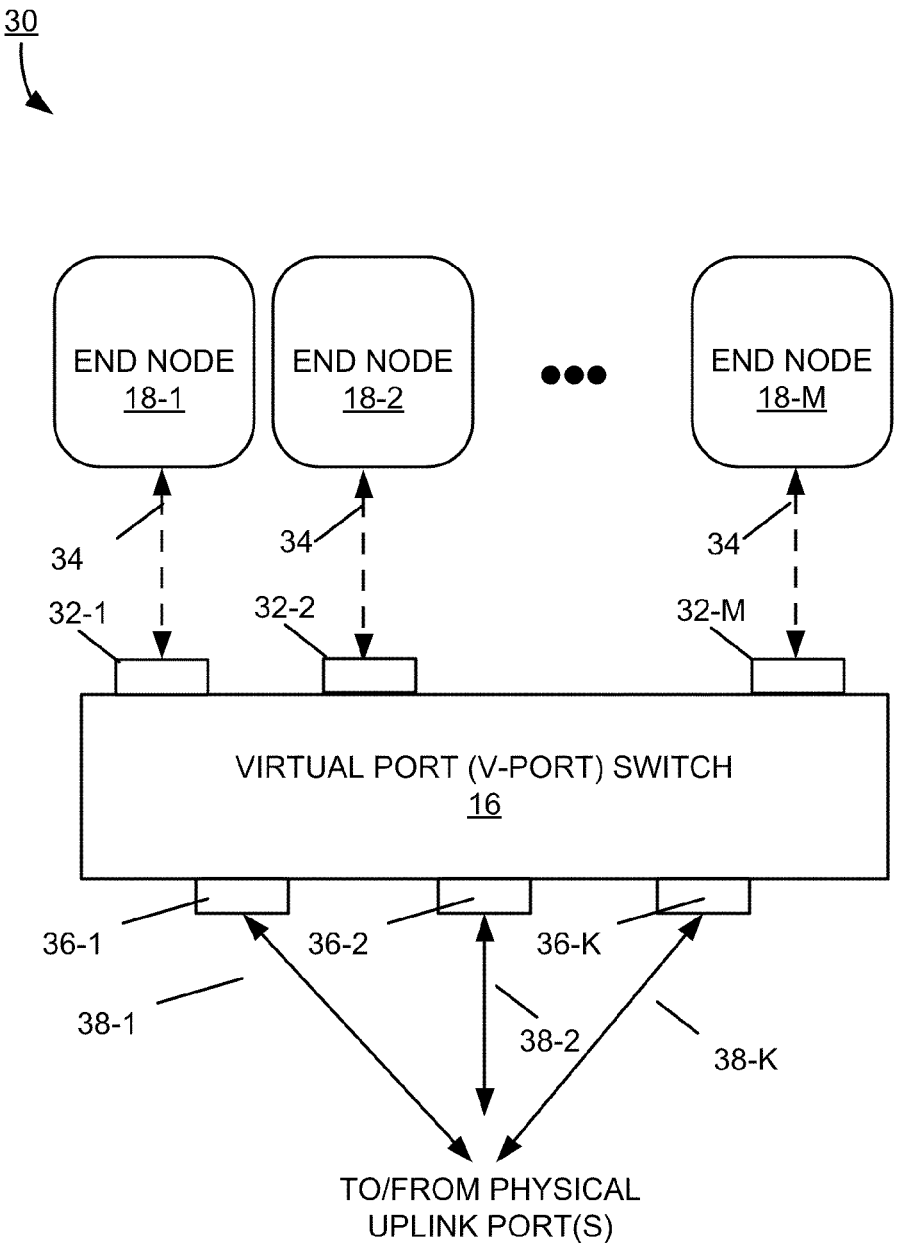
FIG. 2 is a diagram of an embodiment of a logical representation of the data center with each end-node being in communication with a virtual port-based network switch.

FIG. 2 shows an embodiment of a logical representation 30 of the data center, which includes the end-nodes 18-1, 18-2, 18-N of FIG. 1 in communication with the v-port switch 16. Each end-node 18 is logically connected (i.e., associated) to a different virtual port (generally, 32) of the v-port switch. Here, end-node 18-1 is logically connected to the v-port switch 16 by v-port 32-1; end-node 18-2, by v-port 32-2; and end-node 18-M, by v-port 32-M. The logical connections between the end-nodes 18 and v-ports 32 can be considered virtual downlinks 34.

The association of v-ports to end-nodes is one-to-one. Examples of end-node associations of v-ports include, but are not limited to, an association with a virtual NIC or a subset thereof of a virtual machine operating on a physical machine, associations with different queues of a multi-queue NIC or a subset thereof on a physical machine, associations with different network queues or a subset thereof of a CNA, and associations with different types of traffic on a CNA, such as FCoE (Fibre Channel over Ethernet) traffic.

In one embodiment, the v-port switch 16 also defines uplink v-ports 36 that are logically connected to the physical uplink ports 22 (FIG. 1) by virtual uplinks 38. (Each virtual uplink 38 is aligned (has a one-to-one correspondence) with an uplink v-port 36, and connects that uplink v-port to one physical uplink port 22). Multiple virtual uplinks 38, and thus multiple v-ports 36, can logically connect to the same physical uplink port 22. Each v-port 32 is logically associated with one of the uplink v-ports 36, with more than one v-port 32 possibly being associated with any given uplink v-port 36. When a data unit arrives at the v-port switch by way of a v-port 32, the v-port switch switches the data unit to the associated uplink v-port 36, and from the uplink v-port 36, switches the data unit to the particular physical uplink port 22 to which the uplink v-port 36 is logically connected.

In an alternative embodiment, instead of having uplink v-ports 36, each v-port 32 is logically connected to one of the physical uplink ports 22 by a virtual uplink 38. In this embodiment, each virtual uplink 38 has a one-to-one correspondence with a downlink v-port 32 (referred to as downlink to distinguish from the uplink v-ports 36). In this instance when a data unit arrives at the v-port switch by way of a v-port 32, the physical switch switches the data unit to the particular physical uplink port 22 to which the downlink v-port 32 is logically connected.

Figure 3A:
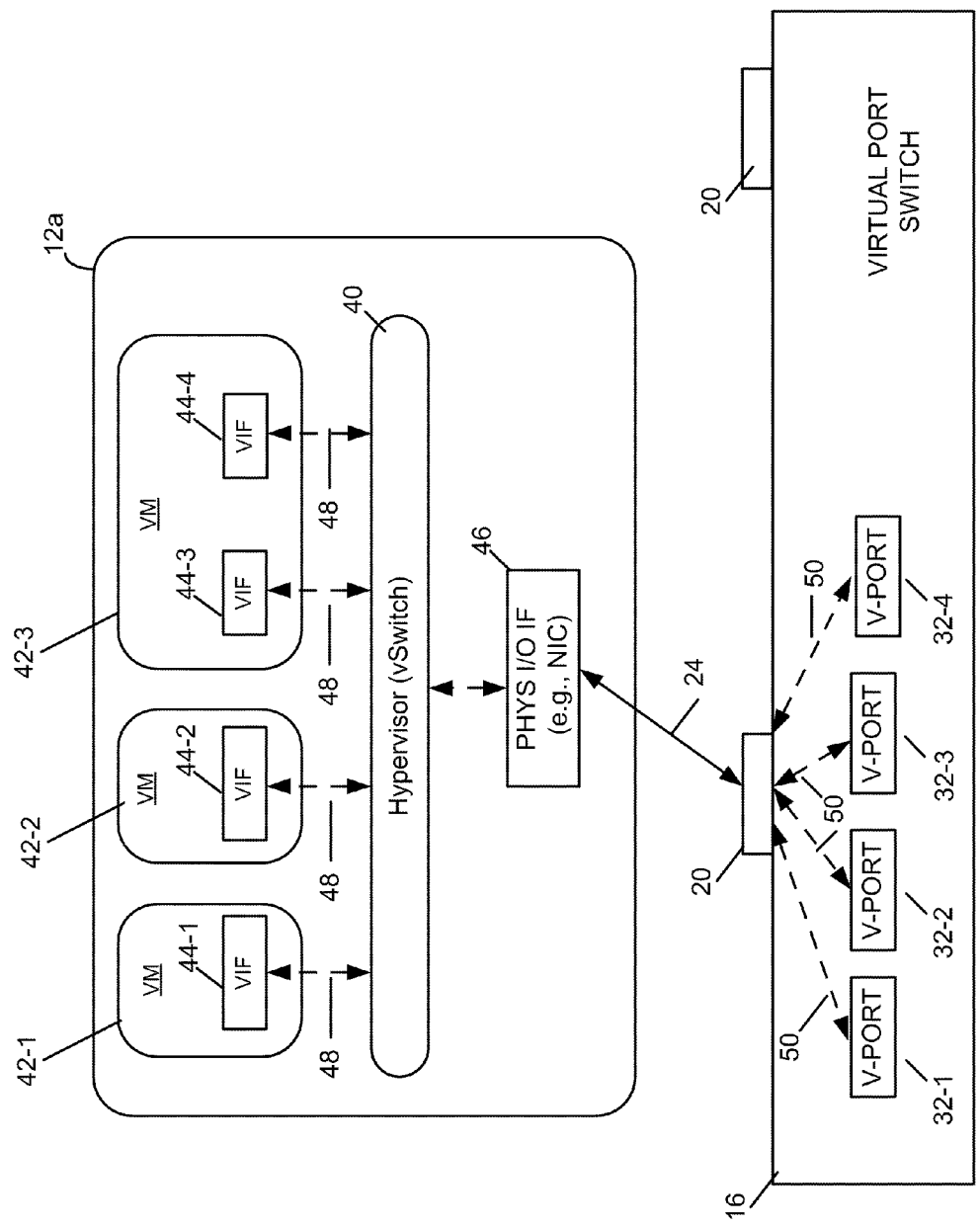
FIG. 3A, FIG. 3B, and FIG. 3C are diagrams of different embodiments of end-nodes and their logical association with virtual ports on the network switch.
Figure 3B:
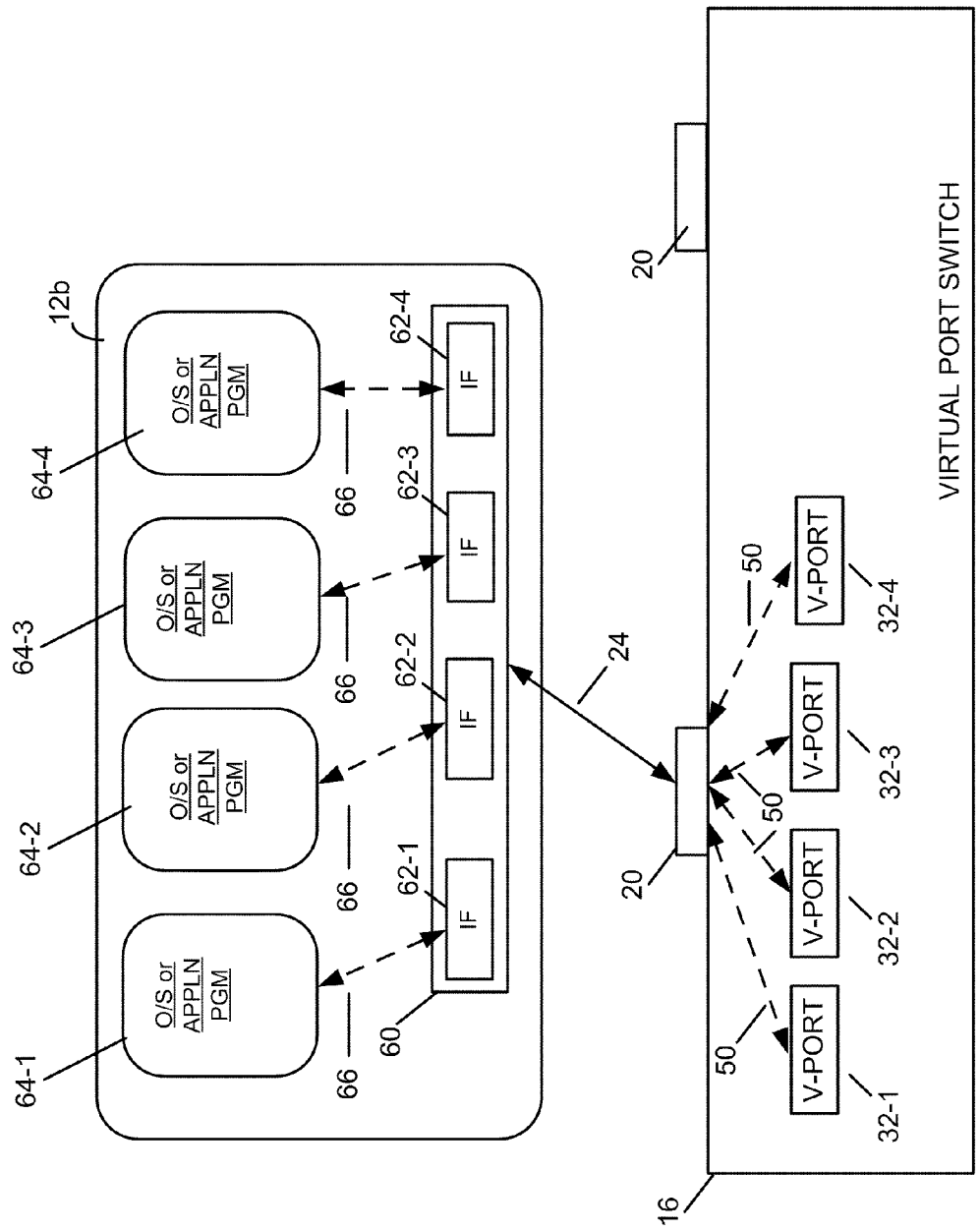
Figure 3C:
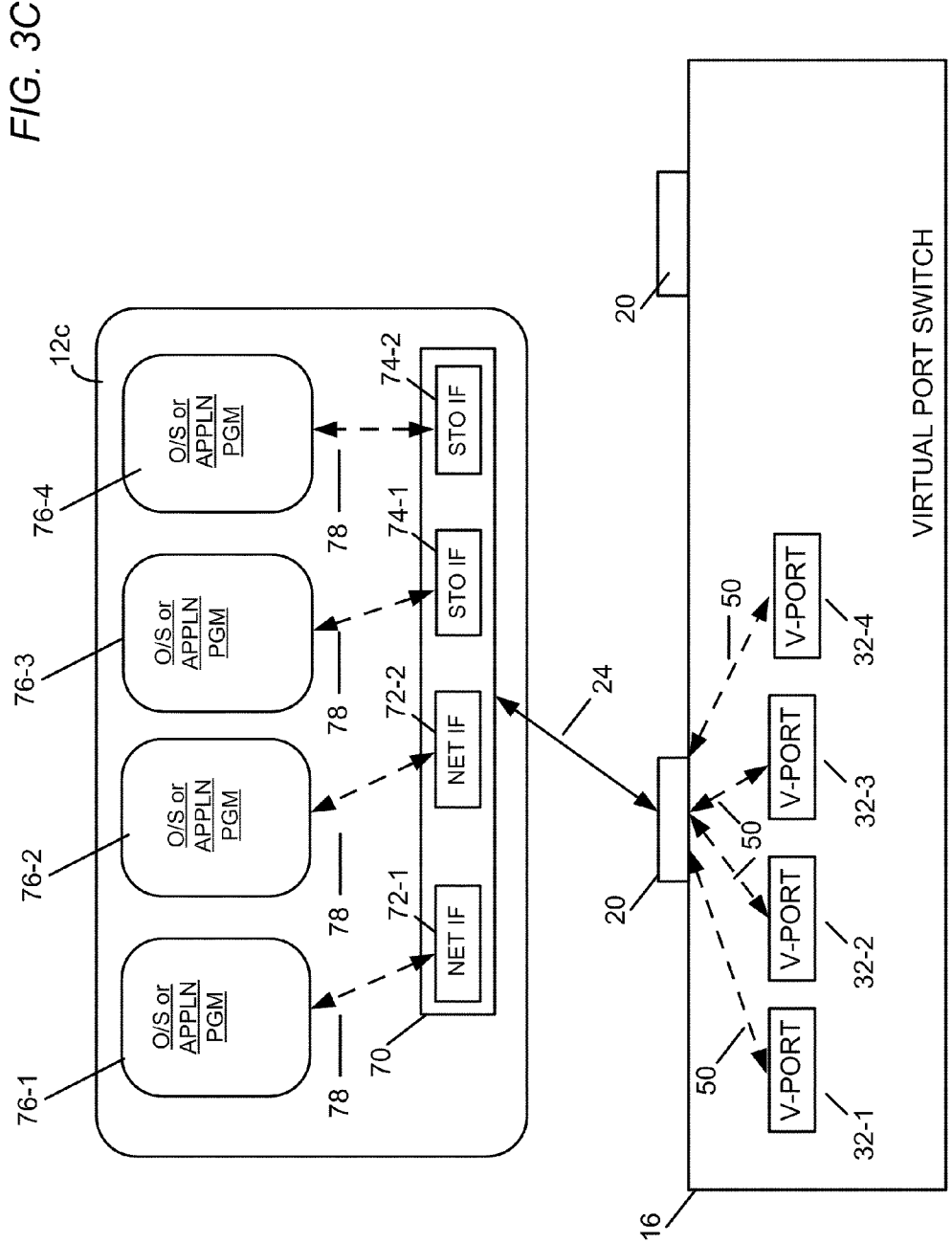

FIG. 3A, FIG. 3B, and FIG. 3C illustrate various examples of relationships between end-nodes and downlink virtual ports of the v-port based switch 16. FIG. 3A shows an example in which multiple end-nodes operate within virtual machines connected to the same physical interface. As shown, a physical machine 12a has virtualization software, which includes hypervisor software 40 for abstracting the hardware of the physical machine 12a into one or more virtual machines (VMs) 42-1, 42-2, 42-3 (generally, 42).

Each virtual machine 42 has one or more associated virtual interfaces (generally, VIF 44), such as a virtual NIC, with each VIF 44 having its own unique virtual MAC address (vMAC). For example, virtual machines 42-1, 42-2 both have one VIF 44-1, 44-2, respectively, and virtual machine 42-3 has two VIFs 44-3, 44-4. In addition, each virtual machine 42 includes at least one application (e.g., a database application) executing within its own guest operating system. Generally, any type of application can execute on a virtual machine.

In this embodiment, each VIF 44 is an example of a virtual end-node. A given VIF 44 can be configured to handle data networking or storage communications. Those VIFs that process data networking communications are examples of virtual network end-nodes, and VIFs that process storage communications are examples of virtual storage end-nodes.

The hypervisor 40 is in communication with a physical I/O adapter 46, for example, a NIC, which handles the I/O to and from the v-port switch 16. Through the hypervisor 40, the VIFs 44 are logically connected to the physical I/O adapter 46, as signified by virtual links 48.

The physical I/O adapter 46 is connected to a physical port 20 by a physical link 24. Logically associated with the physical port 20, as signified by virtual links 50, are four downlink v-ports 32-1, 32-2, 32-3, and 32-4 (generally, 32). Each downlink v-port 32 is uniquely assigned to one of the virtual end-nodes (VIF 44). For example, v-port 32-1 can be assigned to VIF 44-1; v-port 32-2, to VIF 44-2; v-port 32-3, to VIF 44-3; and v-port 32-4, to VIF 44-4. These four downlink v-ports 32 can also be considered logically associated with the physical link 24; that is, each downlink v-port 32 is a subdivided part of the physical link 24.

The number of virtual machines, virtual end-nodes, and virtual ports used in connection with FIG. 3A, and with the subsequent FIGS. 3B and 3C, are merely illustrative examples. The v-port switch can operate with fewer or more virtual machines, virtual end-nodes, and virtual ports than those described. The same number of end-nodes and virtual ports are described in each of the FIG. 3A, FIG. 3B, and FIG. 3C, to facilitate comparison.

FIG. 3B shows an example having multiple instances of end nodes embodied within a single physical interface that is connected to a single physical port of the v-port switch. A physical machine 12b has a physical I/O adapter 60 with a plurality of interfaces 62-1, 62-2, 62-3, 62-4 (generally, 62). In one embodiment, the interfaces 62 are physical interfaces, such as queues of a multi-queue NIC, and are examples of physical end-nodes (storage or network). In another embodiment, the interfaces 62 are virtual interfaces, and are examples of virtual end-nodes (storage or network).

Running on the physical machine 12b are various application programs (or operating system programs) 64-1, 64-2, 64-3, 64-4 (generally, 64). Associated uniquely with each of the programs 64 is one of the interfaces 62. A given program communicates with its associated interface 62 over a virtual link 66.

The physical I/O adapter 60 is connected to a physical port 20 of the v-port switch 16 by a physical link 24. Logically associated with the physical port 20, as signified by virtual links 50, are four downlink v-ports 32-1, 32-2, 32-3, and 32-4 (generally, 32). Each downlink v-port 32 is uniquely assigned to one of the end-nodes (i.e., interfaces 62). For example, v-port 32-1 can be assigned to IF 62-1; v-port 32-2, to IF 62-2; v-port 32-3, to IF 63-3; and v-port 32-4, to VIF 64-4.

FIG. 3C shows an example having multiple instances of end nodes, embodied within a single converged network adapter (CNA) that is connected to a single physical port of the v-port switch and is capable of sending and receiving storage data packets and network data packets. A physical machine 12c has a physical CNA 70 with a plurality of network interfaces 72-1, 72-2 (generally, 72) and a plurality of storage interfaces 74-1, 74-2 (generally, 74). In one embodiment, the network and storage interfaces 72, 74 are physical interfaces, and are examples of physical end-nodes (network and storage). In another embodiment, the network and storage interfaces 72, 74 are virtual interfaces, and are examples of virtual end-nodes (network and storage).

Various application programs (or operating system programs) 76-1, 76-2, 76-3, 76-4 (generally, 76) run on the physical machine 12c. Associated uniquely with each of the programs 76 is one of the interfaces 72 or 74. For example, program 76-1 is associated with network interface 72-1, whereas program 76-4 is associated with storage interface 74-2. Each program 76 communicates with its associated interface 72 or 74 over a virtual link 78.

A physical link 24 connects the physical CNA 70 to a physical port 20 of the v-port switch 16. Logically associated with the physical port 20, as signified by virtual links 50, are four downlink v-ports 32-1, 32-2, 32-3, and 32-4 (generally, 32). Each downlink v-port 32 is uniquely assigned to one of the end-nodes (i.e., interfaces 72 or 74). For example, v-port 32-1 can be assigned to network interface 72-1; v-port 32-2, to network interface 72-2; v-port 32-3, to storage interface 72-1; and v-port 32-4, to storage interface 74-2.

Figure 4:
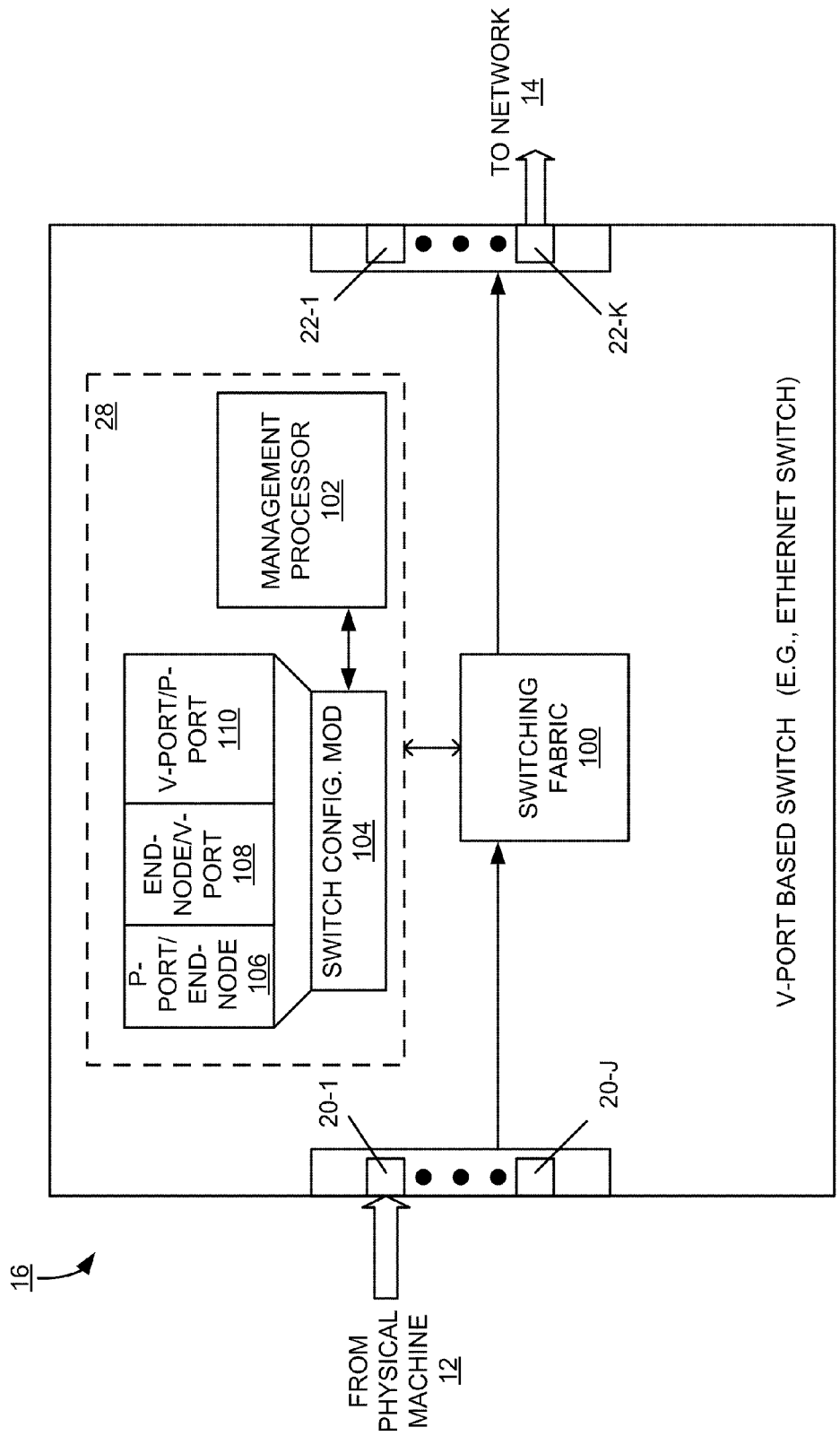
FIG. 4 is a functional block diagram of an embodiment of the network switch.

FIG. 4 shows a functional block diagram of an embodiment of the v-port switch 16 of FIG. 1 including a plurality of physical downlink ports 20-1, 20-N (generally, 20), a plurality of physical uplink ports 22-1, 22-N (generally, 22), and a switching fabric 100 for switching data units between the physical ports 20, 22. In one embodiment, the switching fabric 100 is a layer 2 switch that dispatches data units in accordance with v-port assignments and the traffic-handling policies associated with the v-ports.

Although described herein primarily as v-port based switching device, the switching fabric 100 can also concurrently switch traffic based on physical ports. Those operations that are applicable to physical ports, such as traffic switching between ports and traffic-handling policies (e.g., bandwidth allocation), apply also to v-ports; that is, the switching fabric 100 can switch traffic with respect to v-ports with the same capabilities that it uses to switch between physical ports. The switching fabric 100 can be embodied in a custom semiconductor integrated circuit (IC), such as an application-specific integrated circuit (ASIC) or field-programmable gate array (FPGA) semiconductor device.

The management module 28 of the v-port switch 16 is in communication with the switching fabric 100 to affect the switching behavior of the switching fabric 100, as described herein. Although shown as separate from the switching fabric 100, the management module 28 can be implemented within an ASIC or FPGA with the switching fabric 100. For purposes of communicating with a physical machine, the management module 28 can communicate through the switching fabric 100 and the appropriate physical downlink port 20.

The management module 28 includes a management processor 102 that communicates with a switch configuration module 104. In one embodiment, the switch configuration module 104 is a software program executed by the management processor 102 to give the switching fabric 100 of the v-port switch 16 its v-port-based switching functionality, as described herein. Alternatively, the switch configuration module 104 may be implemented in firmware.

In brief overview, the switch configuration module 104 configures the v-port switch 16 to be aware of the existence and identity of end-nodes operating on those physical machines 12 to which the downlink ports 20 are connected. In addition, the switch configuration module 104 enables an administrator to define v-ports (a programmable number being allowed for each physical port), uniquely assign such v-ports to end-nodes, and associate such v-ports with network resources and traffic-handling policies. The v-port switch can make switching decisions and execute network protocol software with the same capabilities as those used for physical ports.

The switch configuration module 104 can employ various data structures (e.g., tables) for maintaining the logical connections (i.e., associations) among end-nodes, physical ports, and v-ports. For example, a first table 106 can maintain associations between physical downlink ports 20 and end-nodes 18, a second table 108 can maintain associations between end-nodes and v-ports, and a third table 110 can maintain associations between v-ports and physical uplink ports 22. Depending upon the particular implementation, a fourth table, not shown, can be used to map downlink v-ports 32 to uplink v-ports 36. Although shown as separate tables, the tables 106, 108, 110 can be embodied in one table or in different types of data structures.

Figure 5:
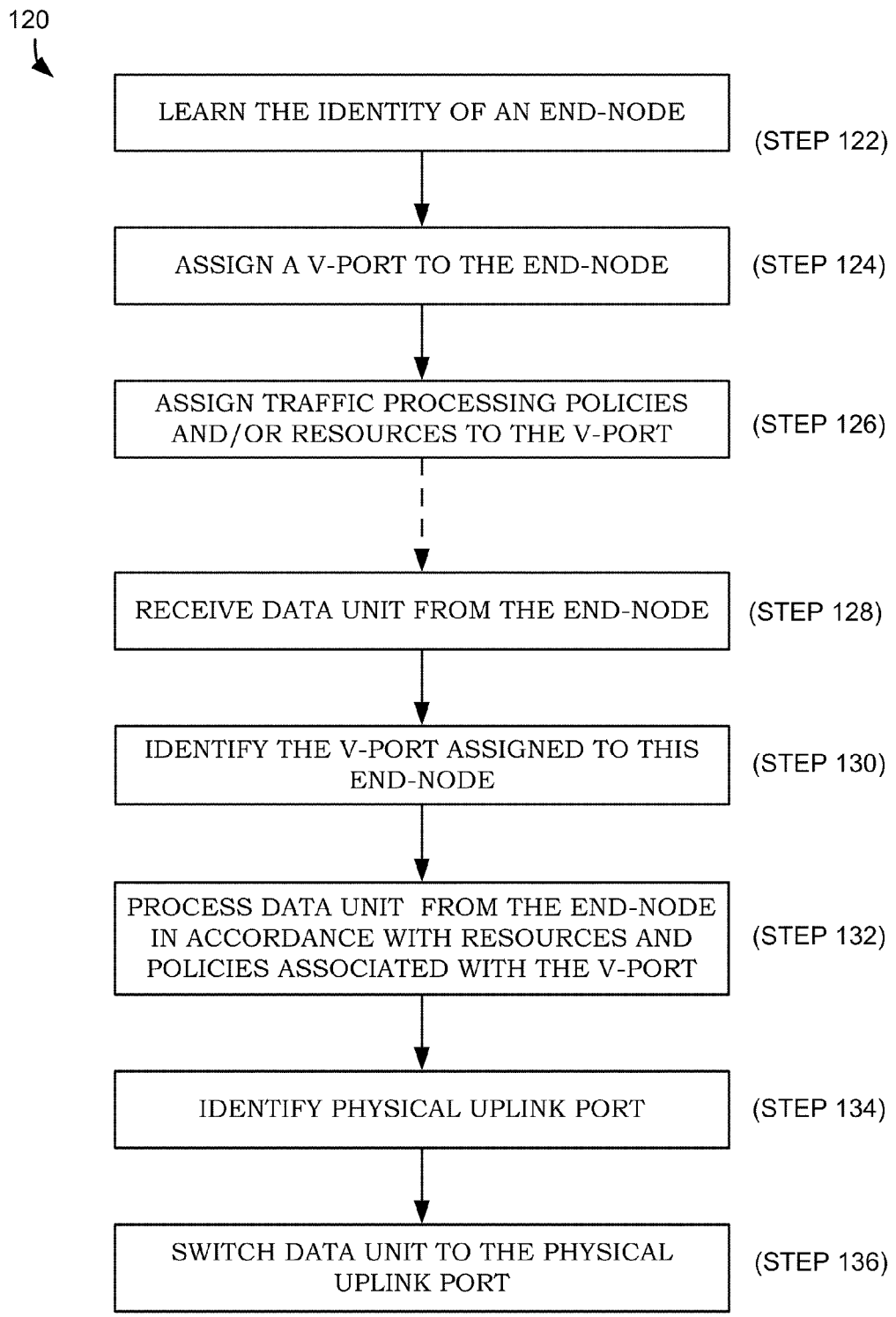
FIG. 5 is a flow diagram of an embodiment of a process for configuring the network switch to be process data units based on virtual ports.

FIG. 5 shows an embodiment of a general process 120 for configuring the v-port switch 16 to process and switch traffic based on v-ports. The order of steps is an illustrative example. Some of the steps can occur concurrently or in a different order from that described. At step 122, the v-port switch 16 identifies a new end-node (network or storage, physical or virtual). The end-node is associated with a physical downlink port 20, namely, the physical port to which the physical machine hosting the end-node is connected. The physical port-to-end-node table 106 can maintain this association.

A unique v-port is assigned (step 124) to the new physical or virtual end-node. Such an assignment can occur statically, in advance, or dynamically, in real time, when the v-port switch learns of a new end-node, for example, from an address in a data unit received from the end-node. The end-node-to-v-port table 108 can hold this assignment.

At step 126, network resources and traffic-handling policies are associated with the assigned v-port. From a capabilities perspective, the assigned v-port is indistinguishable from a physical port of the v-port switch, being given at least the full switching functionality that applies to physical ports. That is, any user level configuration or policies that can be assigned to physical ports can also be assigned to a v-port.

Some examples, one v-port may be allocated a bandwidth of 1 Gbps and another a bandwidth of 2 Gbps, or one v-port may be allowed to drop incoming network packets, while another v-port will not be allowed to drop any incoming network packets, or one v-port may communicate with the end-node about the status of a network resource, such as v-port queue buffer space, while another v-port may not. As still another example, one v-port may be used for network data traffic (e.g., Internet), while another v-port is used for storage data traffic (e.g., FCoE).

Additionally, switching policies can be applied to each v-port individually. (This individual treatment enables each physical or virtual end-node to be represented by a single unique v-port). For example, IGMP (Internet Group Multicast Protocol) membership rules, VLAN (virtual LAN) membership rules, and ACL (access control list) rules can each be applied on an individual v-port basis. Hence, although many v-ports may get instantiated because of traffic arriving at a particular physical port of the v-port switch, there is isolation among the various v-ports.

After being configured to be aware of a particular end-node, the v-port switch 16 can detect when ingress traffic is coming from or addressed to that end-node. Upon receiving a data unit at a physical port and determining the data unit to be related to the end-node (step 128), the switching fabric 100 identifies (step 130) the v-port associated with the end node, and thereby transparently switches the data unit from the physical port to this v-port. Subsequently, the switching fabric 100 processes (step 132) the data unit in accordance with the network resources and policies associated with the v-port. If, in processing the data unit, the switching fabric 100 determines to forward the data unit to an upstream network element, the switching fabric 100 identifies (step 134) the particular physical uplink port 22 (which is mapped to either the v-port or to an uplink v-port associated with the v-port), and transparently switches (step 136) the data unit from that v-port to the identified physical uplink port 22.

Learning of a End-Node

The v-port switch 16 can learn of an end-node in at least one of three manners: (1) the v-port switch can learn the identity of an end-node from data units arriving at a downlink physical port; (2) the v-port switch can directly query the end-node for identifying information using a network-based protocol designed to define virtual links or virtual ports; or (3) an administrator can directly enter the information identifying the end-node into the management module 28.

Data units arriving at a downlink physical port 20 have various fields for carrying information from which the v-port switch can detect and identify an end-node from which the data unit has come. For example, the v-port switch can examine an incoming packet, extract the layer 2 source MAC address, and use this address to define a v-port corresponding to the end-node that sent the packet. Thereafter, the source MAC address serves to identify and link the end-node with the defined v-port.

Instead of eavesdropping on incoming traffic to detect and identify an end-node, the v-port switch can directly query the end-nodes operating on a physical machine to acquire attribute information. The network-based protocol used by the v-port switch can target attributes that can either be snooped from data unit traffic or queried for and obtained from the end-node. The v-port switch can use one of a variety of attribute-gathering mechanisms to send an information request to a driver of a virtual machine, hypervisor, or multi-queue NIC. Examples of such attribute-gathering mechanisms include, but are not limited to proprietary and non-proprietary protocols, such as CIM (Common Information Model), and application program interfaces (APIs), such as VI API for VMware virtualized environments. Examples of attributes that may be gathered include, but are not limited to, the name of the virtualized entity (e.g., VM name, hypervisor name), the MAC or vMAC address, and the IP (Internet Protocol) address of the VM or hypervisor. The protocol used to gather this information in order to generate a v-port can also be used to delete a v-port, or to enable specification of the type of data to be carried by a specific v-port.

Alternatively, an administrator can directly configure the management module 28 of the v-port switch with information that identifies an end-node. To define v-ports, an administrator can apply a heuristic based on any identifier of the end-node. Generally, the heuristic is based on identifying attributes that can be snooped from the data unit traffic. Some examples of such an identifier include the MAC address, IP address, and serial number of a virtual machine. Typically, an administrator comes to know the vMAC addresses of the vNICs (or MAC addresses of the queues of a multi-queue NIC) when configuring an end-node on a physical machine. This address information can be used to configure the v-port switch 16 with a new v-port and to link the new v-port to the end-node before the end-node begins to transmit traffic. The address information is one example; any other identifying information can be used to associate an end-node uniquely with a v-port, provided such information can be found in an incoming data unit. In addition to defining a v-port, the v-port can be configured with regards to the type of data traffic it can carry (e.g., networking data or storage data).

Grouping Virtual Ports

Typically, administrators of a data center tend to place servers that perform a similar function (application or service) into a group and apply certain policies to this group (and thus to each server in the group). Such policies include, but are not limited to, security policies, storage policies, and network policies. Reference herein to a "traffic-handling policy" contemplates generally any type of policy that can be applied to traffic related to an application or service. In contrast, reference herein to a "network policy" specifically contemplates a network layer 2 or layer 3 switching configuration on the network switch, including, but not limited to, a VLAN configuration, a multicast configuration, QoS and bandwidth management policies, ACLs and filters, security and authentication policies, a load balancing and traffic steering configuration, and a redundancy and failover configuration. Although described herein primarily with reference to network policies, the principles described herein generally apply to traffic-handling policies, examples of which include security and storage policies.

Administrators can apply network policies to virtual port on a group basis, regardless of the physical location of the end-node or the particular downlink port 20 by which the end-node accesses the v-port switch 16. For example, an administrator may place those end-nodes involved in performing database functions into a first v-port group, while placing those end-nodes involved in performing web server functions into a second v-port group. To the first v-port group the administrator can assign high-priority QoS (quality of service), port security, access control lists (ACL), and strict session-persistent load balancing, whereas to the second v-port group the administrator can assign less stringent policies, such as best-effort network policies. Furthermore, the administrator can use v-port groups to isolate traffic associated with different functions from each other, thereby securing data within a given group of servers or virtual machines. Moreover, the v-port switch 16 can ensure that end-nodes belonging to one v-port group cannot communicate with end-nodes belonging to another v-port group.

As other examples, link aggregation groups (or trunks) can be formed and traffic can be load shared among v-ports of a group, irrespective of whether the v-ports in the group are associated with the same physical port or distributed across physical ports; IGMP multicast (flood) groups can be formed on a v-port basis, where certain v-ports of a physical port can be part of the group while other v-ports of the physical port are not part of the group; and spanning tree state machines and decisions can be made on a v-port basis, where certain v-ports (of the same or across different physical ports) can be in various spanning tree instances and states.

An administrator can further associate v-port groups with specific network resources including, for example, bandwidth. In addition, each v-port group is assigned an optional given uplink physical port 22 of the v-port switch 16, through which the switching fabric 100 forwards traffic from the end-nodes belonging to that group toward their destinations. More than one group may be assigned the same uplink physical port.

Any number of different v-port groups may be defined. A given v-port group can be comprised of a single end-node corresponding to, for example, a single physical machine, a single virtual machine, or a single queue in a multi-queue NIC. Such v-port group assignments enable the v-port switch to operate at a virtual machine granularity, a queue granularity, at a physical machine granularity, or at a combination thereof.

Embodiments of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for switching data units, the method comprising:
   assigning, by a network switch, a unique downlink virtual port to each end-node operating on a physical machine having a physical network input/output (I/O) adapter that is connected to a downlink physical port of the network switch by a physical link;
   receiving, at the downlink physical port of the network switch, a data unit sent by a given end-node;
   switching, by the network switch, the received data unit from the physical port to the downlink virtual port assigned to the given end-node; and
   switching the data unit, by the network switch from the downlink virtual port assigned to the given end-node, to an uplink virtual port of the network switch,
   switching the data unit from the uplink virtual port to an uplink physical port, for subsequent forwarding of the data unit towards a destination of the data unit, wherein a plurality of uplink virtual ports can share a single uplink physical port.

2. The method of claim 1, wherein each end-node operating on the physical machine corresponds to one or more I/O (input/output) interfaces of the physical network I/O adapter.

3. The method of claim 2, wherein the physical network I/O adapter is a converged network adapter having at least one network I/O interface and one storage I/O interface.

4. The method of claim 2, wherein the physical network I/O adapter is a multi-queue network interface card (NIC) having a plurality of queues, with each queue corresponding to a different end-node operating on the physical machine.

5. The method of claim 2, wherein the one or more I/O interfaces are virtual interfaces.

6. The method of claim 1, wherein each end-node operating on the physical machine corresponds to a virtual NIC of a virtual machine running on the physical machine.

7. The method of claim 1, further comprising dynamically generating the unique downlink virtual port assigned to the given end-node in response to identifying the given end-node.

8. The method of claim 1, further comprising identifying each end-node operating on the physical machine by acquiring information about that end-node from at least one of: input provided by an administrator, information extracted from the data unit received from the physical machine on the physical port, communications exchanged by the network switch with the given end-node using a network-based protocol.

9. The method of claim 1, wherein assigning a unique downlink virtual port to each end-node operating on the physical machine includes configuring the unique downlink virtual port assigned to the given end-node to carry a particular type of data traffic.

10. The method of claim 1, further comprising assigning a traffic-handling policy individually to the downlink virtual port assigned to the given end-node, to be used when processing the data unit.

11. The method of claim 1, wherein switching the data unit to an uplink physical port of the network switch includes switching the data unit to an uplink virtual port logically connected to the uplink physical port by a virtual uplink.

12. A network switch, comprising:
A downlink physical port connected by a physical link to a physical network input/output (I/O) adapter of a physical machine having an end-node operating thereon;
an uplink physical port coupled to a network;
a management module uniquely assigning a virtual port to end-node; and
a switching fabric device receiving, over the physical link from the physical network I/O adapter, a data unit that arrives on the physical downlink port from the end-node, switching the received data unit from the downlink physical port to the downlink virtual port assigned to the end-node switching the data unit, from the downlink virtual port, to an uplink virtual port, and switching the data unit to an uplink physical port for subsequent forwarding of the data unit towards a destination of the data unit
wherein a plurality of uplink virtual ports may be associated with the uplink physical port.

13. The network switch of claim 12, wherein the management module acquires information about the end-node, to be used to assign the downlink virtual port to the end-node, from at least one of: input provided by an administrator, information extracted from the data unit received from the physical machine on the physical port, communications exchanged by the network switch with the given end-node using a network-based protocol.

14. The network switch of claim 12, wherein the management module dynamically generates the downlink virtual port assigned to the end-node in response to identifying the end-node.

15. The network switch of claim 12, wherein the management module configures the downlink virtual port assigned to the end-node to carry a particular type of data traffic.

16. The network switch of claim 12, wherein the switching fabric applies a traffic-handling policy assigned to the virtual port when processing the data unit.

17. A chipset including one or more semiconductor integrated circuit (IC) chips, the chipset for use in switching data units on a network switch having a physical port, the chipset comprising:
a circuit configured to assign a unique downlink virtual port to each end-node identified to be operating on a physical machine having a physical network input/output (I/O) adapter that is connected by a physical link to the physical port of the network switch;
a circuit configured to receive and examine a data unit arriving at the physical port sent from a given end-node operating on the physical machine through the physical network I/O adapter of the physical machine;
a circuit configured to switch the data unit from the physical port to the unique downlink virtual port assigned to the given end-node; and
a circuit configured to switch the data unit from the downlink virtual port to an uplink virtual port, and switch the data unit from the uplink virtual port based on the virtual port assigned to the given end-node, to an uplink physical port for subsequent forwarding of the data unit towards a destination of the data unit, wherein a plurality of uplink virtual ports may share a single uplink physical port.

18. The chipset of claim 17, wherein the circuit configured to switch the data unit, based on the downlink virtual port assigned to the given end-node, to another an uplink physical port includes a circuit configured to switch the data unit to an uplink virtual port logically connected to an uplink physical port by a virtual uplink.

19. A system of networked machines for providing a computational, storage, and networking center of an organization, the system comprising:
a physical machine having a physical network input/output (I/O) adapter and operating a plurality of end-nodes; and
a network switch comprising an downlink physical port connected to the physical network input/output (I/O) adapter of the physical machine by a physical link, acquires information about each end-node operating on the physical machine, uses the information to assign a unique downlink virtual port to each end-node, associates each virtual port individually with a network policy, the physical port receiving data units over the physical link from the physical network I/O adapter; and
a switching fabric processing the data units received through the downlink physical port from each end-node operating on the physical machine in accordance with the network policy associated with the unique downlink virtual port assigned to that end-node, switching the data unit from the downlink virtual port to an uplink virtual port; and forwarding the data unit from the uplink virtual port to an uplink physical port coupled to a network, wherein a plurality of uplink virtual ports may share a single physical port.

* * * * *